INVENTORS
ROBERT A. COHN
SANDFORD ELLIS
BY Bernard Olcott
ATTORNEY

Feb. 4, 1969  R. A. COHN ET AL  3,425,746
PROCESS OF MANUFACTURING A SYNTHETIC BRISTLE BRUSH
Filed Oct. 16, 1967

INVENTORS
ROBERT A. COHN
SANDFORD ELLIS
BY Bernard Olcott
ATTORNEY

United States Patent Office
3,425,746
Patented Feb. 4, 1969

3,425,746
PROCESS OF MANUFACTURING A SYNTHETIC
BRISTLE BRUSH
Robert A. Cohn, 38—54 13th St., Long Island City, N.Y.
11101, and Sanford Ellis, 123 Drisler Ave., White
Plains, N.Y. 10607
Filed Oct. 16, 1967, Ser. No. 680,289
U.S. Cl. 300—21                                     11 Claims
Int. Cl. A46b 3/00; B25b 11/00

ABSTRACT OF THE DISCLOSURE

A process for manufacturing a low cost bristle brush in mass production which has intermediate portions of monofilaments, as supplied from a continuous source, embedded in the body of the brush, both distal ends of such monofilaments extending in rows. The process includes the steps of inserting continuous monofilaments between pluralities of synthetic members of a brush handle, cutting the continuous monofilaments to form spaced layers of U-shaped bristles, and welding together the member and the bristles.

BACKGROUND OF THE DISCLOSURE

This invention relates to a process for manufacturing bristle brushes.

An object of the invention is to provide a process for manufacturing a low cost brush for mass production which employs a plurality of monofilaments as supplied in continuous form, such brush being simpler and cheaper to manufacture than prior art brushes. Generally, the prior art brushes employ natural bristles, monofilaments of short lengths having one end glued in the brush body and/or short length monofilaments which are automatically cut from continuous monofilaments prior to insertion into a brush handle.

SUMMARY OF THE INVENTION

According to this invention there is provided a process for manufacturing a bristle brush which comprises the steps of positioning a first plurality of spaced monofilaments in juxtaposition to a brush handle having a cavity therein, moving a first member having a cavity and a projecting portion to engage its projecting portion with an intermediate portion of the first plurality of monofilaments and to depress them into the cavity of the brush handle, welding together the engaged portions of the brush handle, the plurality of monofilaments and the first member, positioning a second plurality of monofilaments in juxtaposition to the cavity of the first member, moving a second thermoplastic member having a projecting portion to engage its projecting portion with an intermediate portion of the second plurality of monofilaments and to depress them into the cavity of the first member, and welding together the engaged portions of the second plurality of monofilaments and the second member.

Also, there is provided a machine for manufacturing a bristle brush which comprises a holder means adapted to receive a brush handle having a cavity, means for supplying a first member having a projecting portion and a cavity, means for supplying a second member having a projecting portion, a first plurality of spaced monofilaments, a second plurality of spaced monofilaments, means for positioning the first plurality of spaced monofilaments in juxtaposition to the cavity in the brush, means moving the first member so that its projecting portion engages the first plurality of monofilaments and depresses them into the cavity in the brush, first means for welding together the brush handle, the first member and the first plurality of monofilaments, means for positioning the second plurality of spaced monofilaments in juxtaposition the to the cavity in the second member, means moving the second member so that its projecting portion engages the second plurality of monofilaments and depresses them into the cavity in said first member, and second means for welding together the second member and the second plurality of monofilaments.

Further there is provided a bristle brush comprising, welded together, a plurality of component members disposed one within another and a plurality of monofilaments each having an intermediate portion along a continuous juxtapositioned surface of two adjacent component members extending from one surface portion of the brush to another surface portion of the brush, the distal ends of each monofilament extending from such surface portions.

DESCRIPTION OF THE DRAWINGS

In the drawings, in which like reference numbers designate like components in the several views.

DESCRIPTION OF PREFERRED EMBODIMENTS

Figure 1:
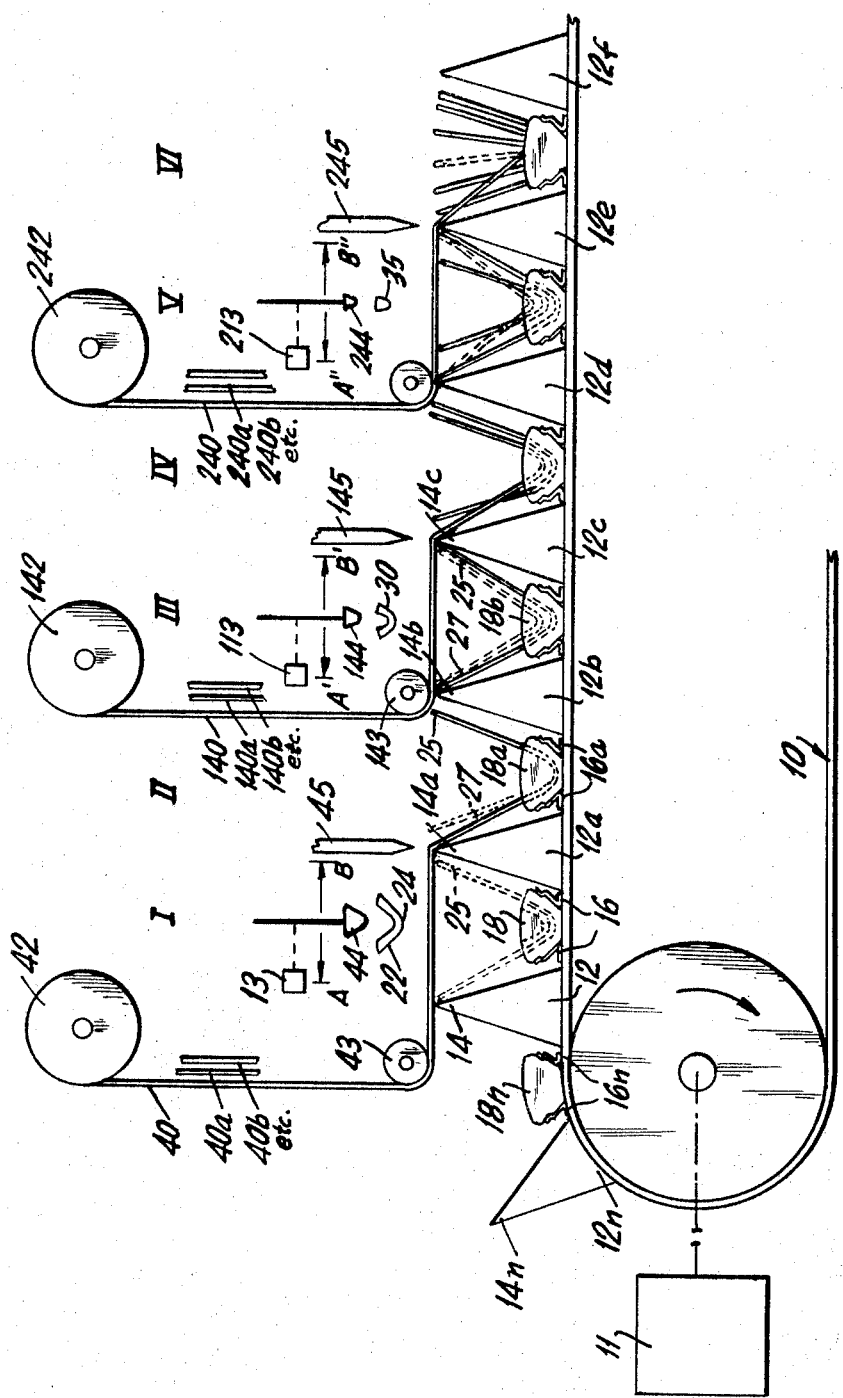
FIG. 1 is a schematic diagram of a machine for manufacturing bristle brushes according to the invention.

In FIG. 1, an endless conveyor belt 10, either intermittently or continuously moved by conventional mechanism 11, has fixed thereto a plurality of spaced supports 12, 12a, 12b . . . 12n, each having an outstanding edge 14, 14a, 14b . . . 14n, disposed transversely to the belt 10. Intermediate the supports 12, 12a, 12b . . . 12n, brush holder clamping means, such as pairs of clips 16, 16a, 16b . . . 16n, are fixed to the belt 10, for removably securing a plurality of brush handles 18, 18a, 18b . . . 18n, to the moving belt 10.

Figure 2:
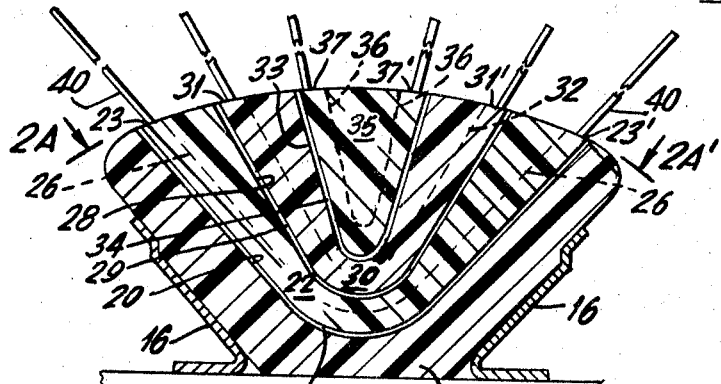
FIG. 2 is a cross-sectional view of a brush as manufactured by the machine of FIG. 1.
Figure 2A:
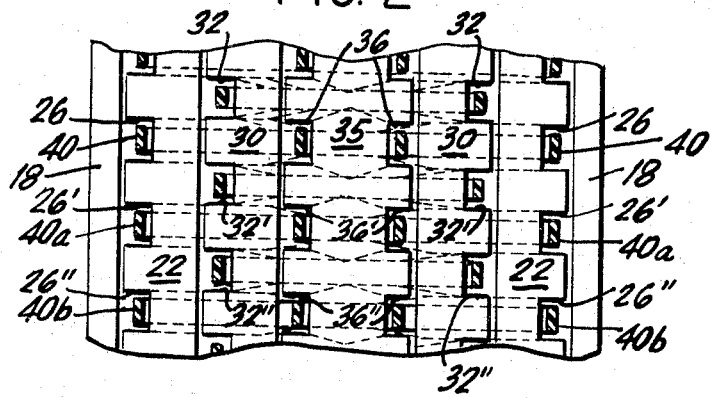
FIG. 2A is a plan view of the brush of FIG. 2 along surface 2A—2A'.

Referring also to FIGS. 2 and 2A, brush handle 18 has a cavity 20 for receiving a member 22 having a projecting portion 24 which has a profile to closely interfit with the profile of cavity 20. Member 22 has a plurality of grooves or apertures 26, 26', etc. opening to the continuous surface between the juxtapositioned surfaces of 18 and 22 to form a plurality of channels or passages which are continuous from one edge position 23 on the left side of the brush, through the body of brush (between 18 and 22) and to a similar edge position 23' on the right side of the brush.

As shown in FIG. 1, a first plurality of spaced monofilaments 40, 40a, 40b, etc., are continuously supplied by a source 42. Optionally, the elements 40, 40a, 40b, etc. may each be a group of thinner monofilaments. The spaced elements 40, 40a, 40b, etc. are passed around a roller 43 and then over the edges 14 and 14a of supports 12 and 12a.

Figure 3:
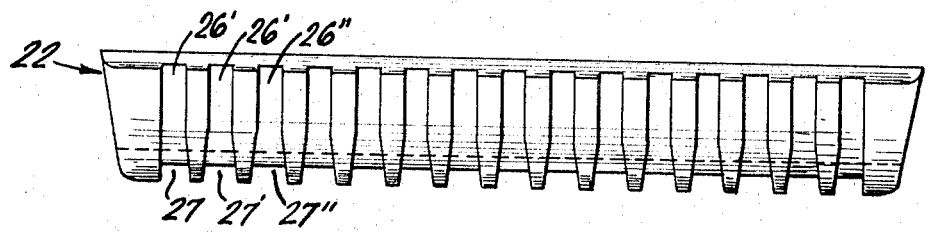
FIG. 3 is a side elevational view of one of the body components of the brush of FIGS. 2 and 2A.

Operations will now be described at Stations I, II, IV, V and VI of the apparatus shown in FIG. 1, which discloses one embodiment for manufacturing a six row brush. A serial supply of members 22 (by mechanism not shown) is provided at Station I above the spaced monofilaments 40, 40a, 40b, etc. When a brush handle 18 arrives at Station I, member 22 is moved by a horn element 44 of an ultrasonic welder (not shown) so that the projecting portion 24 is inserted into the cavity 20 of brush handle 18. During such movement, the plurality of monofilaments 40, 40a, 40b, etc. are depressed into the brush handle and the grooves 26, 26', 26", etc. are preferably flared at their lower portions 27, 27', 27" as shown in FIG. 3 to promote a desired uniform distribution of filaments in the brush. The spacing and size of the monofilaments together with the spacing and size of the grooves or apertures 26, 26', etc. are selected so that all contacting portions of the monofilaments 40, 40', etc. brush handle 18 and member 22 closely fit together. Thereafter, the horn element 44 of the ultrasonic welder is energized for welding together handle 18, element 22 and the monofilaments 40, 40a, etc. therebetween.

At a selected time interval after the horn 44 moves 22 to its final position, and approximately while the welding operation is in progress, a knife blade 45 is moved downwardly to engage the edge of the support thereunder (edge 14a of support 12a in FIG. 1) for cutting off the righthand side of plurality monofilaments 40, 40a, etc. to form the righthand edge group of bristles 25.

At a selected later time, the brush handle moves to Station II where it assumes position 18a. Support 12 takes the position of 12a while support 12n and handle 18n assume the positions 12 and 18 respectively. Thereafter, while handle 18n, another element 22 and filaments 40, 40n, etc. are being welded at Station I, or at a selected time later, knife blade 45 engages the edge of support 12 to cut off the right end of the filaments extending from handle 18n. Simultaneously with such single motion of knife blade 45 against edge 14 (in the position of 14a in FIG. 1), the left ends of the monofilaments 40, 40a, etc. extending from handle 18 are also cut to produce the left edge row of bristles 27, such partially completed brush being shown as 18b in FIG. 1.

Referring back to FIGS. 2 and 2A, element 22 has a cavity 28 (which is similar to, but different in size than cavity 20 in handle 18) for receiving the projecting portion 29 (similar to but different in size than 24) of an element 30 which interfits into the cavity 28 of 22. Elements 30 has a plurality of grooves or apertures 32, 32', 32", etc. opening to the continuous surface between the juxtapositioned surfaces of 22 and 30 to form a plurality of channels or passages which are continuous from one intermediate position 31 on the left side of the brush, through the body of the brush, and to a similar intermediate position 31' on the right side of the brush.

Element 30 has a cavity (similar to but different in size than cavity 28) for receiving a projecting portion 34 of a closing element 35, such closing member having continuous grooves or channels 36, 36', 36", etc. which are similar to 32, 32', etc. and 26, 26', etc. for forming a plurality of channels or passages which are continuous from one center position 37 on the left side of the brush to the center position 37' on the right side of the brush.

As hereinbefore described, the partially completed brush shown in FIG. 1 in position 18b has incorporated therein only the bristles in the pair of outside rows defined by the welding together of members 18 and 22. To complete the brush, a plurality of monofilaments of the correct length has to be welded in passages 32, 32', etc. and 36, 36', etc. to form intermediate and center pairs of bristle rows, respectively, and elements 35 and 30 have to be welded together and to element 24 (which is welded to handle member 18).

Accordingly, as shown in FIG. 1, at another position along the machine, there is provided another source 142 of a plurality of monofilaments 140, 140a, 140b, etc. passing over a roller 143 and over the edges 14b, 14c of supports 12, 12c between which there is disposed another horn 144 of an ultrasonic welder (not shown) and mechanism (not shown) for serially inserting elements 30, together with monofilaments 140, 140a, 140b, etc., into the cavity 28 of element 22 prior to the welding operation by horn 144. Another knife blade 145 coacts with whichever support 12 is thereunder for cutting off the right and left ends of the monofilaments 140, 140a, 140b, etc. at Stations III and IV in the similar manner that monofilaments 40, 40a, 40b, etc. were cut by knife blade 45 at Stations I and II.

In similar manner, another plurality of monofilaments 240, 240a, 240b, etc. from another continuous source 242 are provided further along the machine for the center pairs of rows of bristles passing through passages 36, 36', 36", etc. Assuming the completed brush is to have three pairs of bristle rows, the closure element 35 is inserted into cavity 33 of 30 by an ultrasonic horn 244, the vertical movement of 35 depressing the plurality of filaments 240, 240a, 240b, etc. into the brush at Station V. Cutting the left and right ends of such filaments is accomplished by a knife 245 at Stations V and VI (as knives 45 and 145 function at Stations I and II) to complete the manufacturing of the six row brush according to this invention.

As mentioned hereinbefore, conveyor belt 10 by mechanism 11 can be either intermittently moved in Stations I, III and V or continuously moved through Stations I, III and V. If 10 is continuously moved, horns 44, 144 and 244 are arranged to be moved by conventional mechanisms 13, 113, 213 from positions A to B, A' to B' and A" to B" in synchronism with the movement of belt 10 so that the welding and solidification of the melted parts can take place over a selected period of time. Thereafter, horns 44, 144, 244 are rapidly returned by the same conventional mechanisms 13, 113, and 213. If the belt 10 is intermittently moved, the brush handles at Stations I, III and IV will be held stationary for a selected time while the weld operations are performed by 44, 144 and 244 and, thereafter, while the welded parts are solidifying. While such solidifying time is normally small, it can be shortened by optional cooling means (not shown) such as air blasts, water bath, etc.

Preferably, the brush components 18, 22, 30 and 35 are moulded plastic parts of thermoplastic materials, such as polystyrene of the high impact type and thermoplastic materials available under the trademarks Lustran of the Monsanto Company, Styron of the Dow Chemical Company, and Dylene of the Koppers Company, Inc. The monofilaments preferably are synthetic thermoplastic filaments, such as nylon, polyester, polypropylene, styrene, Dacron (trademark of the Du Pont Company), etc. or natural fibres such as wool or cotton. However, other materials, such as metal or metallic coated substances may be used. Also, other welding apparatus may be substituted for the ultrasonic welder.

While there has been described and pointed out the fundamental novel features of the invention as applied to preferred embodiments, it will be understood that various omissions and substitutions and changes in the form and details of the devices illustrated and its operation may be made by those skilled in the art, without departing from the spirit of the invention. It is the intention, therefore, to be limited only as indicated by the scope of the following claims.

What we claim is:

1. The process for manufacturing a bristle brush which comprises the steps of positioning a first plurality of spaced monofilaments in juxtaposition to a brush handle having a cavity therein, moving a first member having a cavity and a projecting portion to engage its projecting portion with an intermediate portion of said first plurality of monofilaments and to depress them into the cavity of said brush handle, welding together the engaged portions of said brush handle, said plurality of monofilaments and said first member, positioning a second plurality of monofilaments in juxtaposition to the cavity of said first member, moving a second thermoplastic member having a projecting portion to engage its projecting portion with an intermediate portion of said second plurality of monofilaments and to depress them into the cavity of said first member, and welding together the engaged portions of said second plurality of monofilaments and said second member.

2. Process according to claim 1 wherein said and second plurality of monofilaments are continuous from respective first and second sources of supply and including the steps of moving said brush handle to a first position for said welding together of the brush handle, the first plurality of monofilaments and the first member, cutting said first plurality of monofilaments at a location beyond said brush handle relative to said first source, moving said brush handle away from said first source to a second position, cutting said first plurality of monofilaments between said brush handle and said first position, moving said brush handle to a third position for said welding together of the second plurality of monofilaments and the second member, cutting said second plurality of monofilaments at a location beyond said brush handle relative to said second source, moving said brush handle away from said second source of supply to a fourth position and cutting said second plurality of monofilaments between said brush handle and said second source.

3. Process according to claim 2 wherein said brush handle is moved from said first through said fourth positions on a conveyor belt and said brush handle is positioned between supports fixed to said belt on each side of said brush handle and including the steps of alternately placing said first and second plurality of monofilaments between said supports prior to its associated depressing and welding step, alternately engaging said supports with a knife blade which is movable transversely to but not laterally with said belt for the two cutting operations of said first plurality of monofilaments, and alternately engaging said supports with another knife blade which is movable transversely to but not laterally with said belt for the two cutting operations of said second plurality of monofilaments.

4. Process according to claim 1 including the steps of providing grooves in at least one of the juxtapositioned elements of said brush handle and the projecting portion of said first member to receive said first plurality of monofilaments and providing grooves in at least one of the juxtapositioned elements of said first member and the projecting portion of said second member to receive said second plurality of monofilaments.

5. Process according to claim 1 including the additional step of using at least another source of spaced monofilament supply, another member and another depressing and welding operation so that at least another pair of rows of spaced bristles are provided in the completed brush.

6. Process according to claim 1 wherein said brush handle is moved intermittently in a direction perpendicular to the direction of movements of said first and second members.

7. Process according to claim 1 wherein said brush handle is moved continuously in a direction perpendicular to the direction of movements of said first and second member.

8. Process according to claim 3 wherein said conveyor belt is moved intermittently and the belt is held stationary during the welding operations at said first and third positions.

9. Process according to claim 3 wherein said conveyor belt is moved continuously in said first and third positions and including means to move said first and second welding means in synchronism with said belt during the welding operations thereat.

10. Process according to claim 1 wherein said brush handle, said members and said monofilaments are synthetic thermoplastic materials.

11. Process according to claim 1 wherein the cavity portion of said brush handle, said members and said monofilaments are metallic materials.

References Cited

UNITED STATES PATENTS

| | | | |
|---|---|---|---|
| 1,130,442 | 3/1915 | Speese | 15—204 |
| 1,556,783 | 10/1925 | Gray | 300—21 |
| 2,294,480 | 9/1942 | Rohweder et al. | 300—21 XR |
| 2,974,932 | 3/1961 | Xenis | 15—197 XR |
| 3,328,822 | 7/1967 | Sellesi. | |

FOREIGN PATENTS 21,811     1909     Great Britain.

PETER FELDMAN, *Primary Examiner.*

U.S. Cl. X.R.

15—159, 181, 205; 300—8, 11